United States Patent [19]
Ligneul et al.

[11] Patent Number: 5,864,067
[45] Date of Patent: Jan. 26, 1999

[54] FLUIDIC OSCILLATOR AND A METHOD OF MEASURING A VOLUME-RELATED QUANTITY OF FLUID FLOWING THROUGH SUCH A FLUIDIC OSCILLATOR

[75] Inventors: Patrice Ligneul, Chaville; Philippe Hocquet, Vanves, both of France

[73] Assignee: Schlumberger Industries, S.A., Montrouge, France

[21] Appl. No.: 767,989

[22] Filed: Dec. 17, 1996

[30] Foreign Application Priority Data

Jun. 17, 1994 [FR] France ................................. 94 07487
Jun. 8, 1995 [WO] WIPO ..................... PCT/FR95/00754

[51] Int. Cl.[6] ........................................................ G01F 1/66
[52] U.S. Cl. ......................................................... 73/861.21
[58] Field of Search ........................... 73/861.28, 861.39, 73/861.19, 861.21

[56] References Cited

U.S. PATENT DOCUMENTS

| | | | |
|---|---|---|---|
| 4,182,172 | 1/1980 | Wennberg et al. | 73/194 B |
| 5,363,704 | 11/1994 | Huang | 73/861.19 |
| 5,396,808 | 3/1995 | Huang et al. | 73/861.19 |
| 5,503,035 | 4/1996 | Itoh et al. | 73/861.19 |

*Primary Examiner*—Richard Chilcot
*Assistant Examiner*—Jewel V. Thompson
*Attorney, Agent, or Firm*—Leonard W. Pojunas

[57] ABSTRACT

A fluidic oscillator is symmetrical about a longitudinal plane of symmetry in which a longitudinal fluid flow direction is contained. The oscillator generates a two-dimensional jet of fluid that oscillates transversely relative to said longitudinal plane symmetry. An ultrasound signal is generated in the fluid flow travelling from one transducer towards another. The ultrasound signal is received and modulated by the oscillations of the jet of fluid. The received signal is processed to determine a volume-related quantity concerning the fluid that has flowed through said fluidic oscillator. The tow ultrasound transducers are substantially in alignment with the longitudinal plane of symmetry.

29 Claims, 9 Drawing Sheets

FLUIDIC OSCILLATOR AND A METHOD OF MEASURING A VOLUME-RELATED QUANTITY OF FLUID FLOWING THROUGH SUCH A FLUIDIC OSCILLATOR

The present invention relates to a fluidic oscillator and to a method of measuring a volume-related quantity of fluid flowing through said fluidic oscillator.

It is known to use fluidic oscillators for measuring for a volume-related quantity of fluid such as flow rate if the frequency of the oscillations is measured, or volume if the number of oscillations is counted. Such a fluidic oscillator is described, for example, in French patent application No. 92 05301 filed by the Applicant, and based on detecting the frequency of oscillation of a two-dimensional fluid jet in an oscillation chamber.

The fluid jet is formed as the liquid flow passes through a slot which opens out into the oscillation chamber, and it oscillates transversely relative to the plane of longitudinal symmetry of the fluidic oscillator. An obstacle is placed in the oscillation chamber and possesses a cavity in its front portion, which cavity is placed on the path of the fluid jet so that said jet sweeps the walls of the cavity during oscillation. Flow rate measurement is performed, for example, by detecting the jet sweeping over the bottom of the cavity as it oscillates, with the frequency of oscillation of the jet being proportional to the fluid flow rate.

Also known from patent application GB-A-2 120 384 is a fluidic oscillator operating on a somewhat different principle since it is a Coanda effect oscillator, but its end purpose remains measuring a volume-related quantity of a fluid by detecting the oscillation frequency of a jet of fluid. That fluidic oscillator includes three obstacles housed in an oscillation chamber, two of the oscillators being situated on opposite sides of the longitudinal plane of symmetry immediately downstream from the fluid admission opening into said chamber and co-operating with the side walls of the oscillation chamber to form two symmetrical channels, and the third obstacle is disposed facing the fluid admission opening, but downstream from the first two obstacles at the sides.

During its sweeping motion, the fluid jet meets one of the side obstacles, and attaches thereto, the fluid flow then moving upstream and taking the channel formed between said obstacle and one of the walls of the oscillation chamber, thereby causing the fluid to circulate again.

When the fluid flow reaches the upstream zone situated close to the fluid admission opening at which the base of the fluid jet is situated, the flow then causes said jet to switch over towards the other side obstacle and the same phenomenon is reproduced with said other side obstacle. The fluidic oscillator also includes two ultrasound transducers disposed on either side of a fluid flow position such that Ultrasound signals are emitted and received in planes that are substantially transverse to the longitudinal direction of fluid flow.

In the measurement method described, one of the transducers emits towards the other transducer which is placed downstream from the first or in the same transverse plane as the first, and the emitted signal is modulated by the oscillations of the fluid jet in the oscillation chamber so the other transducer receives said ultrasound signal as modulated in this way.

On the basis of the received signal, it is possible to detect the frequency f of oscillation of the fluid jet, and to deduce therefrom the flow rate or the volume of the fluid that has flowed through the fluidic oscillator.

That British patent application then explains that the received signal is demodulated and transformed into a pulse signal where each pulse corresponds to a unit volume of fluid swept through by the fluid jet during its oscillation.

That measurement technique provides the advantage of achieving good measurement repeatability over the usual range of flow rates for a fluidic oscillator. However, in some cases, it is necessary to obtain very good accuracy in flow rate or in volume measurement, and consequently it can be advantageous to have a fluidic oscillator whose sensitivity can be easily improved over its usual range of flow rates.

In addition, it is known that a fluidic oscillator cannot measure a volume-related quantity of a fluid when the flow rate of the fluid is so low that it is no longer possible to detect the frequency of fluid jet oscillations.

In domestic installations, it is also known that, for most of the time, the flow rates of a fluid, e.g. gas, are very low, being typically less than 200 liters per hour (l/h). It is therefore particularly important to be able to measure flows at such rates as well as being able to measure the maximum values of flow rate that can happen occasionally. In addition, it is also necessary to be able to detect fluid leaks when they occur and thus it must be possible to distinguish a leakage rate from a small flow rate.

The present invention seeks to remedy the drawbacks of the prior art by proposing a fluidic oscillator structure that is easily adapted to more accurate measurement of a volume-related quantity of a fluid over the usual range of flow rates for said fluidic oscillator, should that be necessary, and which is also easily adaptable to measuring a small volume-related quantity of a fluid, at which fluid jet oscillations disappear.

The invention also proposes a method of measurement that is adapted to measuring a volume-related quantity of a fluid in each of the above-specified cases.

Thus, the present invention provides a fluidic oscillator that is symmetrical about a longitudinal plane of symmetry, the oscillator comprising:

means for generating a two-dimensional jet of fluid that oscillates transversely relative to said longitudinal plane of symmetry;

two ultrasound transducers;

and means firstly for generating an ultrasound signal in the fluid flow travelling from one of said transducers towards the other, and secondly for receiving said ultrasound signal as modulated by the oscillations of the jet of fluid; and means for processing the received signal so as to determine a volume-related quantity concerning the fluid that has flowed through said fluidic oscillator; characterized in that the ultrasound transducers are substantially in alignment with the longitudinal plane of symmetry.

This novel disposition of the ultrasound transducers in a fluidic oscillator is highly advantageous firstly because by choosing to place said transducers specifically in the plane of symmetry or slightly offset therefrom, it is possible to promote detection at the oscillation frequency of the jet or at twice that frequency, thereby increasing the sensitivity of said fluidic oscillator, and secondly, while using the same transducers positioned in this way and whether operating at the oscillation frequency or at twice the oscillation frequency, it is possible to measure small volume-related quantities of a fluid for which the oscillations of the fluid jet are too small for it to be possible to detect the frequency thereof.

The fluidic oscillator obtained in this way is referred to as a "combined" oscillator and it covers a range of flow rates that is wider than the usual range of flow rates for a conventional fluidic oscillator.

To this end, provision is made for the fluidic oscillator to include:

means for emitting and receiving an ultrasound signal alternately from each of the ultrasound transducers; and means responsive to each received ultrasound signal and to consecutive pairs of ultrasound signals to determine a value for a magnitude that is characteristic of the propagation speed of said ultrasound signal as modified by the fluid flow, and to deduce therefrom a volume-related quantity applicable to the fluid that has flowed through said fluidic oscillator.

The ultrasound transducers are disposed in different transverse planes, an "upstream" one of said transducers being disposed upstream from the means for generating the two-dimensional jet of fluid, the other transducer being a "downstream" transducer.

Given that the fluid jet oscillation phenomenon is observed over a large range of flow rates covering the higher values of the flow rate, the range of rates for which fluid jet oscillations are too weak to be capable of being detected is relatively small.

Consequently, in this small range, it is possible to use transducers that are highly resonant, and therefore of relatively simple design.

For example, the magnitude representative of the speed of propagation of the ultrasound signal may be the propagation time of said signal. Alternatively said magnitude may be the phase of said signal.

In an embodiment of the invention, the fluidic oscillator comprises:

means for generating a two-dimensional oscillating fluid jet, which means are formed by a fluid admission opening of transverse dimension or width d and of height h;

an oscillation chamber connected at one of its ends to said fluid admission opening and at its opposite end to a fluid outlet opening, said openings being in alignment in said longitudinal plane of symmetry; and at least one obstacle disposed in said oscillation chamber between the admission opening and the fluid outlet opening.

According to other characteristics of the fluidic oscillator:

the upstream transducer is disposed upstream from the fluid admission opening;

the obstacle has a front portion in which a cavity is formed facing the fluid admission opening;

the downstream transducer is secured to the obstacle; and the downstream transducer is disposed in the cavity of the obstacle.

According to other characteristics of the invention:

the oscillator includes, upstream from the obstacle, a passage for the fluid that is defined by two walls that are perpendicular to the longitudinal plane of symmetry and that are spaced apart by a distance h;

the oscillator includes, upstream from the fluid admission opening, a longitudinally-extending channel forming at least a portion of the passage for the fluid, said channel being of substantially constant width d that is perpendicular to the distance h;

the channel possesses, at one of its ends, a "downstream" opening that corresponds to the fluid admission opening, and at its opposite end, an "upstream" opening which, in a plane parallel to the flow direction of the fluid and perpendicular to the longitudinal plane of symmetry, is convergent in shape, its width tapering progressively down to the width d;

it includes two fluid inlets disposed symmetrically about the longitudinal plane of symmetry and opening out into the passage, upstream from the channel;

it includes two fluid inlets disposed symmetrically about the longitudinal plane of symmetry and opening out into the passage, upstream from the channel;

two side passages extending in a direction that is generally parallel to the longitudinal plane of symmetrical and in particular to the longitudinal direction of the channel each constitutes a fluid inlet, each of said passages being connected firstly via one end to a common first chamber perpendicular to said plane and secondly, via an opposite end, to a common second chamber parallel to said first chamber, said first chamber being provided with a fluid feed;

an empty space forming another portion of the passage for the fluid is provided upstream of the channel and the two fluid inlets open out into said empty space;

the upstream transducer is disposed upstream from the empty space;

in that the ultrasound transducers are situated on the same side in a direction perpendicular to the longitudinal direction of the fluid flow, and contained in the longitudinal plane of symmetry;

in that both ultrasound transducers are secured to the same one of the walls defining the passage for the fluid;

the ultrasound transducers are offset in a direction perpendicular to the longitudinal direction of fluid flow and contained in the longitudinal plane of symmetry; and in that each ultrasound transducer is secured to a respective one of the walls defining the passage for the fluid.

The invention also provides a method of measuring a volume-related quantity of a fluid flowing through a fluidic oscillator in which a jet of fluid oscillates transversely about a longitudinal plane of symmetry, said method consisting successively in:

emitting an ultrasound signal into the fluid flow from an ultrasound transducer;

receiving said ultrasound signal as modulated by the oscillations of the jet of fluid by using another ultrasound transducer; and processing the received signal so as to determine said volume-related quantity of the fluid that has flowed through the oscillator; the method being characterized in that it consists in emitting an ultrasound signal in a direction that is substantially contained in the longitudinal plane of symmetry.

Advantageously, by aligning the ultrasound transducers accurately in the longitudinal plane of symmetry of the fluidic oscillator and by emitting an ultrasound signal in said plane, and in the fluid flow direction, said ultrasound signal which is modulated by the oscillations of the jet of fluid and as picked up in said longitudinal plane of symmetry is affected mostly by the frequency $2f$ where f represents the frequency of oscillation of said jet of fluid. By detecting the frequency $2f$, it is therefore possible to double the sensitivity of the fluidic oscillator over its usual range of flow rates, i.e. at flow rates for which the oscillations of the jet of fluid are detectable. This frequency of $2f$ cannot be detected when applying the technical teaching of patent application GB-A-2 120 384.

In contrast, when it is desired to use the combination fluidic oscillator to cover the widest possible range of flow rates without seeking to improve the sensitivity of said oscillator, it is not necessary to position the ultrasound transducers accurately in the longitudinal plane of symmetry. The ultrasound transducers are then substantially aligned with the longitudinal plane of symmetry in such a manner as to present an inclination of 1° to 2° relative to the longitudinal direction of said plane of symmetry.

Given transducers disposed in this way for measuring a volume-related quantity of fluid at a high flow rate, i.e. when the oscillations of the jet of fluid are strong enough to enable the frequency thereof to be detected, it is possible to emit an ultrasound signal in the flow direction of the fluid through the fluidic oscillator. The ultrasound signal as modulated by the oscillations of the jet of fluid and as picked up is then affected mostly by the frequency of oscillation f of said jet of fluid. With the transducers in this disposition, an ultrasound signal is preferably emitted in the direction opposite to the fluid flow direction through the fluidic oscillator for the purpose of improving detection of the oscillation frequency f over the situation where the ultrasound signal is propagating in the same direction as the fluid flow direction.

By having the transducers in this advantageous disposition, it is also possible to measure a volume-related quantity of a fluid at a low flow rate, i.e. when the oscillations of the jet of fluid are too small to be detectable and the method of the invention then consists successively in:

emitting an ultrasound signal from one of the transducers towards the other in a direction that is substantially contained in the longitudinal plane of symmetry;

receiving said ultrasound signal whose speed of propagation has been modified by the flow of the fluid;

determining a first value of a magnitude characteristic of said speed of propagation of the received ultrasound signal;

repeating the above steps after interchanging the emitter and receiver functions of the ultrasound transducers and determining a second value for said magnitude characteristic of the speed of propagation for another ultrasound signal; and deducing therefrom the measurement of a small volume-related quantity of the fluid.

The invention is particularly advantageous in the field of gas metering.

Other characteristics and advantages appear from the following description given by way of non-limiting illustrative example and made with reference to the accompanying drawings, in which.

Figure 1:
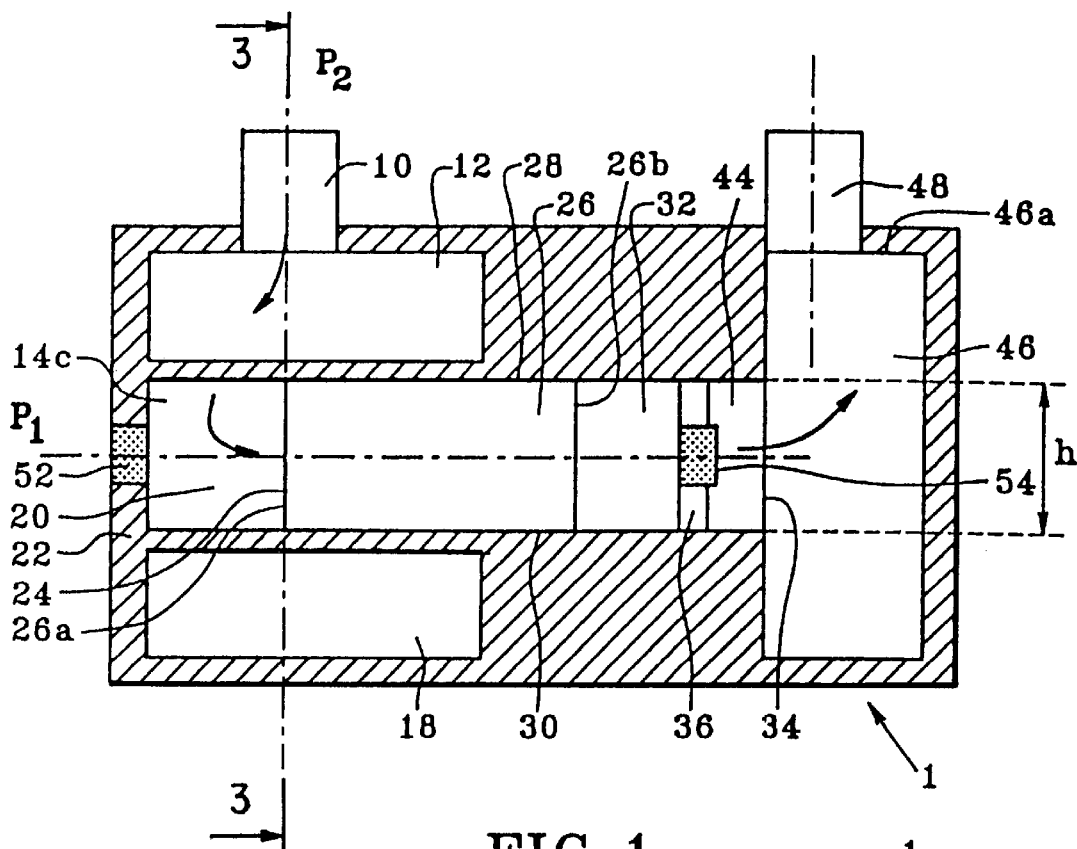
FIG. 1 is a diagrammatic longitudinal section view on the longitudinal plane of symmetry P of an embodiment of the fluidic oscillator of the invention.
Figure 2:
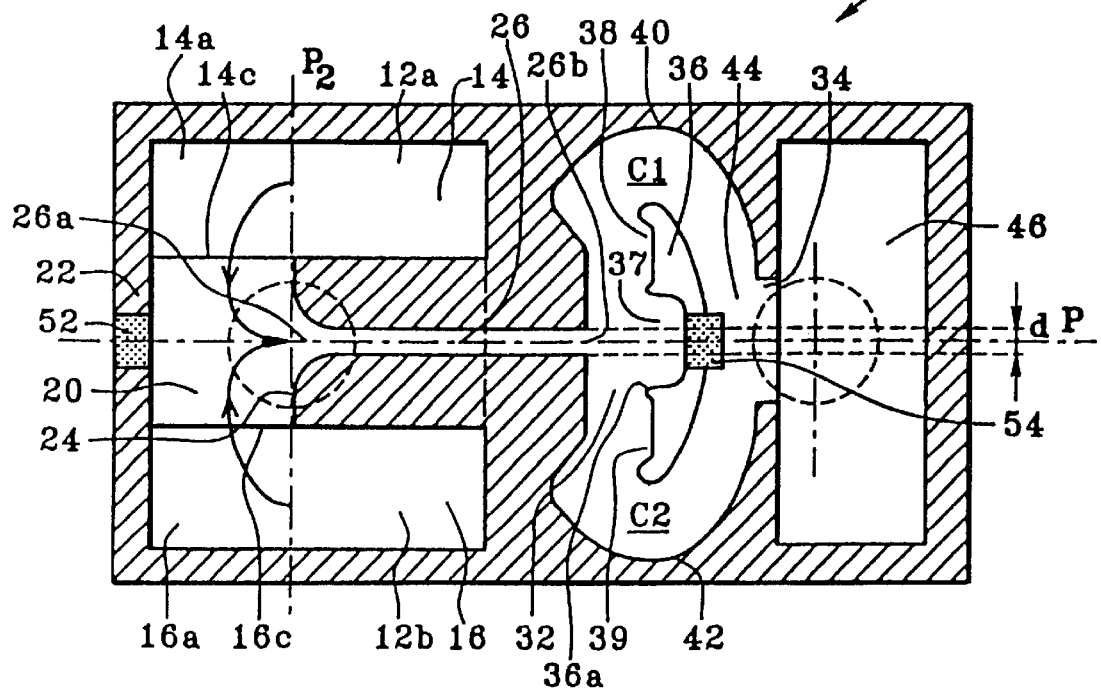
FIG. 2 is a diagrammatic view of the FIG. 1 fluidic oscillator on plane P1.

As shown in FIGS. 1 and 2, and as given overall reference 1, the fluidic oscillator of the invention is applicable, for example, to domestic gas metering, and it possesses a longitudinal plane of symmetry P which is disposed vertically and which corresponds to the plane of FIG. 1.

It should be observed that the fluidic oscillator may also operate in a position such that its plane P is horizontal or even in some other position without that disturbing the measurement of the volume-related quantity of a fluid (e.g. flow rate or volume proper). The fluid flowing through said fluidic oscillator is a gas, but it could equally well be a liquid, e.g. water.

The fluidic oscillator shown in FIG. 1 has a vertical gas feed 10 that is centered relative to the longitudinal plane of symmetry P and opens out into a "top" first horizontal chamber 12 which is of large size and disposed symmetrically about said plane P. The flow section of said top chamber 12 is rectangular in shape and parallel to the longitudinal plane of symmetry P, and it subjects the flow of gas that enters via the feed 10 to a sudden increase in section, e.g. equal to a factor of 4, in order to destroy the turbulent structure of the flow by reducing its speed.

Figure 3:
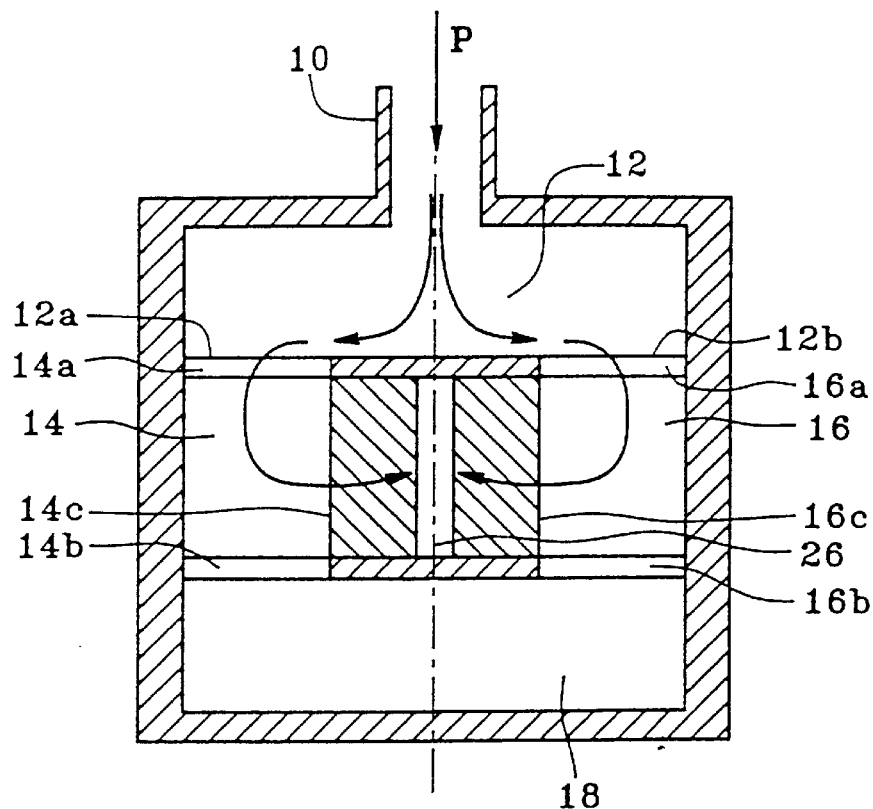
FIG. 3 is a fragmentary diagrammatic view in section on A through the embodiment of the fluidic oscillator as shown in FIG. 1.

The top chamber 12 possesses two opposite "end" openings 12a and 12b each opening out into a respective vertical side passage 14 or 16 (as shown in FIGS. 2 and 3) of rectangular flow section identical to the flow section of said first chamber 1. The two vertical side passages 14 and 16 are symmetrical to each other about the longitudinal plane of symmetry P.

Each side passage 14 (16) communicates firstly at a "top" one of its ende 14a (16a) that coincides with the corresponding end 12a (12b) of the top first chamber 12, and secondly at its opposite or "bottom" end 14b (16b) with a "bottom" second chamber 18 that is identical to the first chamber 12, as shown in FIG. 1. The top and bottom chambers 12 and 18 are symmetrical to each other about the plane P1 shown in FIG. 1 and they are parallel to each other, but it would also be possible for the volume of the bottom chamber 18 to be smaller.

Each of the two vertical side passages 14 and 16 constitutes a gas inlet and has a middle side opening 14c, 16c of flow section parallel to the longitudinal plane of symmetry P (FIG. 2). The gas inlets 4 and 16 open out via their side openings 14c and 16c into an empty space 20 situated halfway between the bottom and top chambers 18 and 12. The empty space 20 which forms an intermediate chamber of smaller size than the chamber 12, possesses a "transverse" long dimension which is perpendicular to the longitudinal plane of symmetry P, and it is defined along said dimension firstly by an "upstream" end wall 22 and secondly by a "downstream" end wall 24. The walls 22 and 24 are spaced apart by a distance which corresponds to the longitudinal dimension of the side openings 14c and 16c. A channel 26 in alignment on the longitudinal plane of symmetry P is provided through the downstream wall 24. This channel 26 is referred to as the "main" channel and has a transverse dimension or "width" d that is substantially constant along the entire longitudinal dimension or "length" of the channel. The length of the channel is preferably greater than 10d in order to obtain good accuracy in measuring the volume-related quantity of a gas at low flow rates, i.e. when the oscillations of the jet of gas are too weak for their frequency to be detectable. As shown in FIG. 2, the upstream opening 26a of the main channel 26 has a shape that converges in the plane P1. Each portion of the upstream opening 26a which is on one side or the other of the plane P has a convex profile, e.g. a substantially rounded profile, thereby contributing to progressively reducing the width of said opening down to the width d of the main channel 26.

Figure 4:
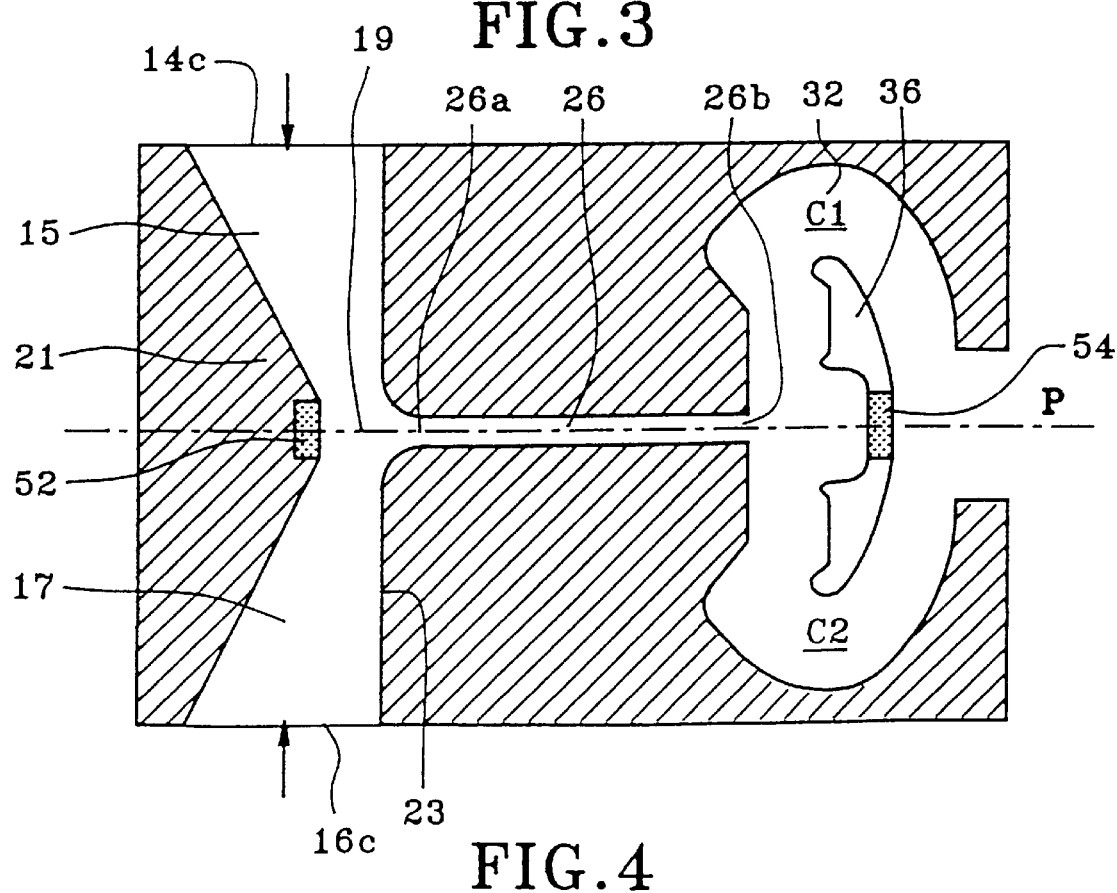
FIG. 4 is a diagrammatic view on the plane P1 showing a variant embodiment of the fluidic oscillator shown in FIG. 2.

In a variant of the invention shown in FIG. 4, the gas inlets or vertical side passages 14 and 16 (not shown in this figure) open out via side openings 14c and 16c into respective "gas inlet" horizontal channels 15 and 17. The flow section of each horizontal channel tapers progressively. The two gas inlet channels 15 and 17 are symmetrical about the plane P and they meet in a zone 19 situated in said plane P immediately upstream from the upstream opening 26a of the main channel. The horizontal channels are defined firstly by a common "upstream" end wall 21 that projects in a downstream direction, and secondly by a common "downstream" end wall 23. As described above, a main channel 26 in alignment on the longitudinal plane of symmetry P is provided in the downstream wall. The gas inlet channels 15 and 16 and the main channel 16 thus form a horizontal passage for the gas which is defined above and below by a top wall and by a bottom wall (not shown in the plane of FIG. 4) that are spaced apart by a height h.

The fluidic oscillator shown in FIGS. 1 and 2 includes means for generating a two-dimensional jet of gas that oscillates transversely relative to the longitudinal plane of symmetry P. These means are formed by a gas admission opening into an "oscillation" chamber 32, which opening coincides with the downstream opening 26b of the main channel and is rectangular in shape. The oscillation chamber 32 has one of its ends connected to the downstream opening 26b of the main channel 26 and has its opposite end connected to a gas outlet opening 24 of width greater than d. The gas admission and outlet openings 26b and 34 are in alignment on the plane P.

The fluidic oscillator also includes an obstacle 36 of height h disposed in the center of the oscillation chamber 32 between the gas admission opening 26b and the gas outlet opening 34. A horizontal passage for the gas situated upstream from the obstacle 36 is formed in part by the empty space 20 and the channel 26 and is defined above and below respectively by a "top" wall 28 and by a "bottom" wall 30 (FIG. 1). These two walls 28 and 30 are separated from each other by a height h. Such an obstacle 36 has already been described in French patent application No. 92 05301. The obstacle 36 has a front portion 36a in which a cavity 37 is formed, referred to as the "central" cavity, which cavity faces the admission opening 26b of the oscillation chamber 32.

Two secondary cavities 38 and 39 are also provided in the front portion 36a of the obstacle 36 symmetrically about the plane P. The oscillation chamber 32 possesses side walls 40 and 42 of a shape that substantially matches the outside shape of the obstacle 36, thereby cooperating with said obstacle 36 to provide two symmetrical secondary channels C1 and C2 situated on either side of the longitudinal plane of symmetry P.

The width of the secondary channels C1 and C2 is substantially constant in order to avoid disturbing the flow of gas. The secondary channels C1 and C2 pass round the obstacle 36 and meet again downstream therefrom in a zone 44 situated immediately upstream from the outlet opening 36 of the oscillation chamber 32. This outlet opening 34 opens out into a vertical passage 36, at a point halfway up it, as shown in FIG. 1. The vertical passage 46 is, for example, symmetrical about the longitudinal plane of symmetry P and at a "top" one of its ends 46a it has a vertical gas outlet 48 centered relative to said plane P. The configuration described with reference to FIGS. 1 to 3 has the advantage of conferring satisfactory compactness to the fluidic oscillator.

The movements of the flow of gas in the fluidic oscillator are now described. A vertical flow of gas is fed to the fluidic oscillator via the vertical feed 10 and penetrates into the top chamber 12 of said fluidic oscillator, where it splits into two portions. These two portions of the "main" flow travel horizontally through the top chamber 12 of the fluidic oscillator in opposite directions perpendicular to the longitudinal plane of symmetry P. As shown in FIG. 3, each portion of the flow passes through an end opening 12a (12b) of the top chamber 12 of the fluidic oscillator and penetrates into one of the vertical side passages 14 (16), performing rotary motion prior to being engulfed in the empty space 20 via one of the side openings 14c (16c).

This configuration is designed to enable the gas to get rid of any polluting particles with which it might be charged (dust . . . ) as it passes through the vertical side. passages 14 and 16 where, under the effect of gravity and of the rotary motion of the flow, such particles are sent towards the bottom chamber 18 of the fluidic oscillator.

When the two portions of the flow of gas penetrate symmetrically about the plane P into the empty space 20, they meet on said plane P and are engulfed in the main channel 26 via its upstream opening 26a. The flow of gas then travels along the main channel 26 and is transformed into an oscillating two-dimensional jet at the downstream opening 26b thereof. Within the oscillation chamber 32, the flow of gas alternates between the channel C1 and the channel C2 prior to reaching the outlet opening 34 and then flowing up the vertical passage 46 towards the vertical gas outlet 48.

Given that the vertical passage 46 extends vertically to a level below that of the oscillation chamber 32, it too can serve to rid the gas of certain polluting particles if they have not already been eliminated. As mentioned above, the fluidic oscillator may be placed in some other position in which there is no need to provide a bottom chamber 18 for the purpose of removing dust from the gas.

In accordance with the invention, the fluidic oscillator has two ultrasound transducers 52 and 54 that are substantially in alignment with its longitudinal plane of symmetry. The advantage of removing the major fraction of polluting particles from the gas is to avoid contaminating the transducers, thereby increasing their lifetime.

In the embodiment of the invention shown in FIGS. 1 to 3, the ultrasound transducers 52 and 54 are offset angularly by about 1.5° from the longitudinal plane of symmetry P in order to respond mainly to the frequency of oscillation f of the jet of gas in the ultrasound signal as modulated by the oscillations of said jet of gas. This angular offset serves to distinguish the frequency f from the frequency 2f in the modulated ultrasound signal. If the angular offset exceeds 2°, then there is a risk of the ultrasound signals being multiply reflected in the main channel 26, thereby degrading the quality of the signal, and in particular reducing its signal/noise ratio. In the event that it is desired to improve the sensitivity of the fluidic oscillator over its usual range of flow rates (e.g. 100 /h to 6000 l/h), then, in order to enhance detection of the frequency 2f, it is necessary to place the ultrasound transducers very accurately in the longitudinal plane of symmetry P and it is also preferable to emit the ultrasound signal from the upstream end towards the downstream end.

As shown in FIGS. 1 and 2, the ultrasound transducers 52 and 54 are disposed facing each other in different transverse planes. The term "transverse plane" is used herein to designate a plane perpendicular to the longitudinal plane of symmetry P and to the gas flow direction. If the ultrasound transducers are placed in the same transverse plane, as they are in the prior art, then they are not suitable for measuring a volume-related quantity of gas at low flow rates since the emitted ultrasound signals cannot pick up information concerning the speed of flow of the gas.

The upstream transducer 52 is situated upstream from the admission opening 26b, and more precisely upstream from the empty space 20. As shown in FIGS. 1 and 2, the upstream transducer 52 is received in the upstream end wall 22 and is thus protected from the gas flow. The downstream transducer 54 is secured to the obstacle 36 and, more precisely, it is disposed in the main cavity 37 of said obstacle.

As shown in the variant embodiment of FIG. 4, the upstream transducer 52 is disposed in the middle portion of the upstream end wall 21, i.e. in its portion closest to the main channel 26, whereas the downstream transducer 54 is secured to the obstacle 36 as described above.

Figure 5:
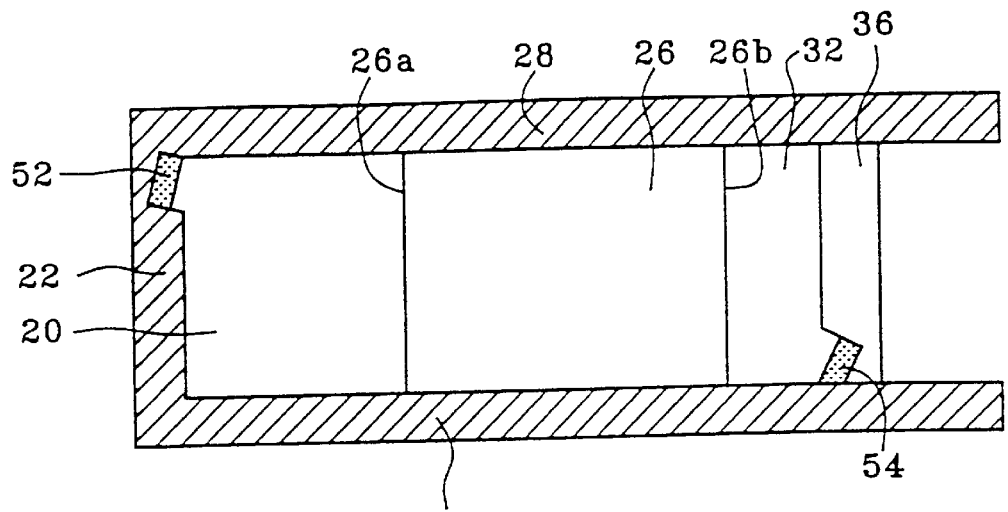
FIG. 5 shows a first variant embodiment of the disposition of the ultrasound transducers shown in FIG. 1.

In the embodiment described with reference to FIGS. 1 and 2, the upstream and downstream transducers 52 and 54 are situated at the same height relative to the height h of the channel 26 of the fluidic oscillator. In a variant of the invention, the upstream and downstream ultrasound transducers may also be situated at different heights relative to the height h of the channel 26 of the fluidic oscillator, but they must always face each other. For example, as shown in FIG. 5, the difference in height between the upstream and downstream ultrasound transducers may be substantially equal to h.

Figure 6:
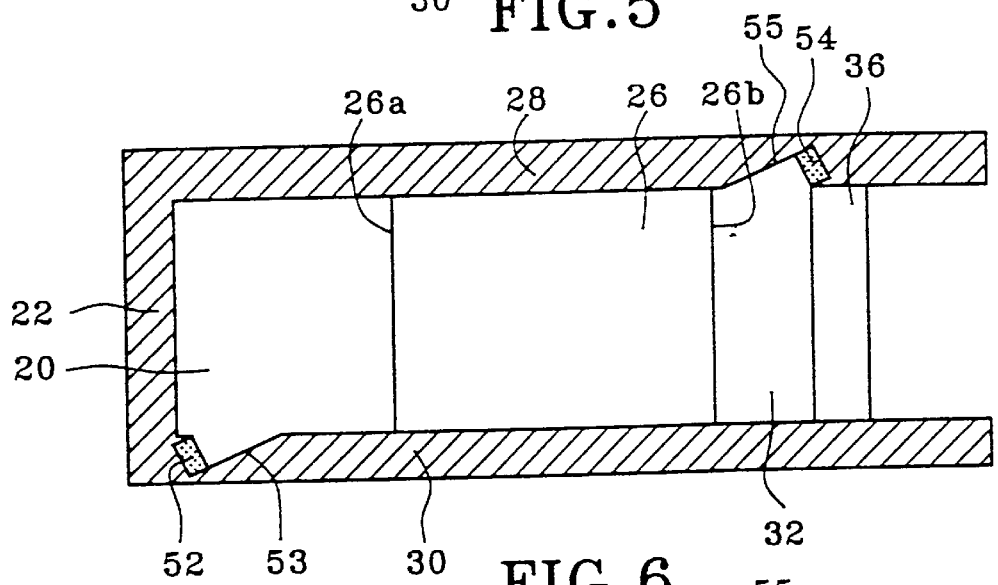
FIG. 6 shows a second variant embodiment of the disposition of the ultrasound transducers shown in FIG. 1.

In another variant of the invention, as shown in FIG. 6, the upstream and downstream ultrasound transducers 52 and 54 are likewise situated at different heights, but the upstream transducer 52 is mounted at the bottom of a recess 53 formed in the bottom wall 30 of the fluidic oscillator, beneath the empty space 20. The downstream transducer 54 is mounted in the top of a recess 54 mounted in the top wall 28 of the fluidic oscillator substantially over the obstacle 36. The upstream and downstream transducers are disposed facing each other.

Figure 7:
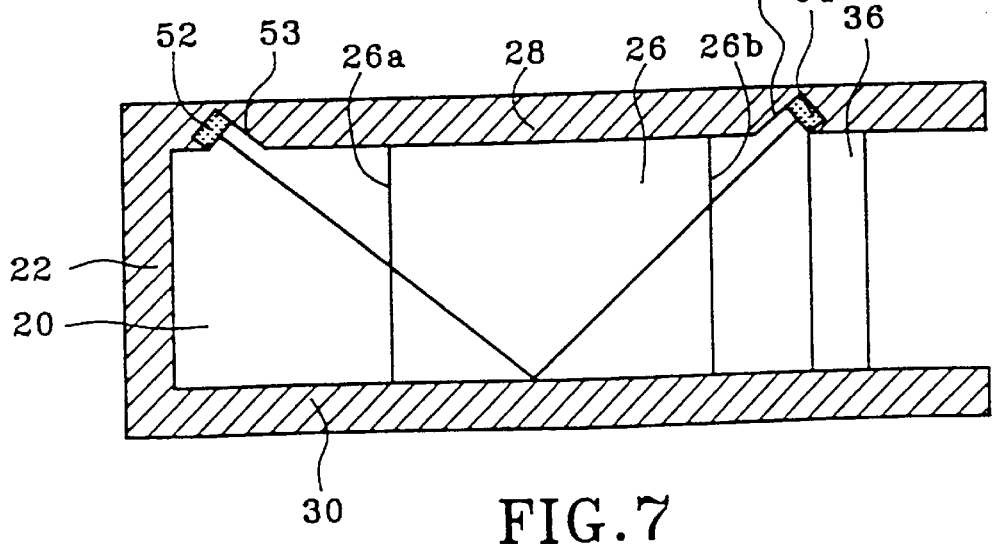
FIG. 7 shows a third variant embodiment of the disposition of the ultrasound transducers shown in FIG. 1.

In yet another variant as shown in FIG. 7, the upstream and downstream ultrasound transducers 52 and 54 are situated at the same height and they no longer face each other. The transducers are mounted in respective recesses 53 and 55 both of which are formed in the top wall 28 of the fluidic oscillator. The downstream transducer 54 is situated substantially over the obstacle 36 and the recess 55 in which it is installed does not extend as far as the channel 26 in order to avoid disturbing the formation of the jet of gas. In addition, the downstream transducer 54 must be based downstream from the channel 26 so that the ultrasound signals can be modulated sufficiently by the oscillations of the jet of gas. The path followed by the ultrasound signals in the longitudinal plane of symmetry P is thus a V-shaped path.

Figure 8:
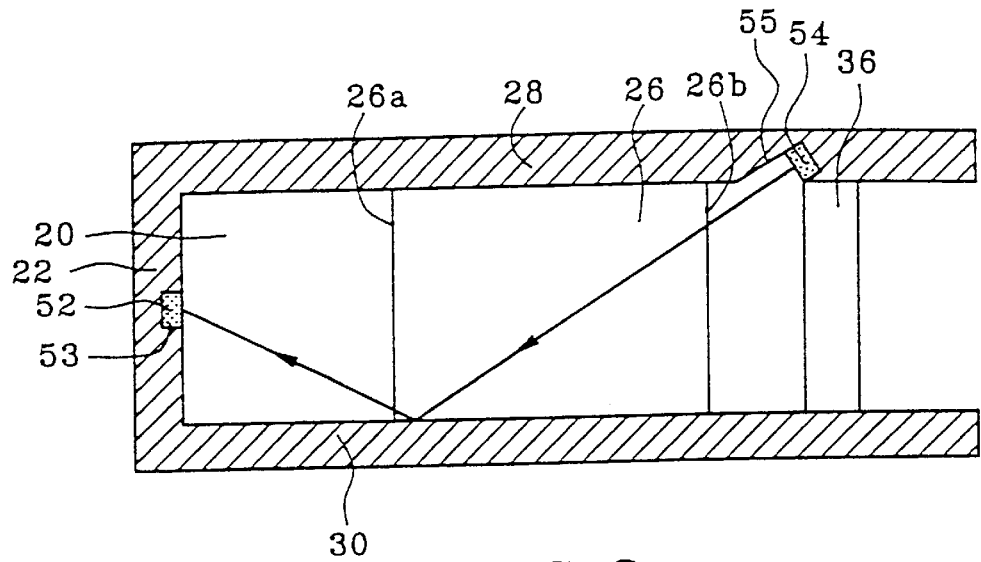
FIG. 8 shows a fourth variant embodiment of the disposition of the ultrasound transducers shown in FIG. 1.

The variant shown in FIG. 8 also serves to obtain a V-shaped path for the ultrasound signals in the longitudinal plane of symmetry P, but with the ultrasound transducers being disposed at different heights. The upstream transducer 52 is mounted in a recess formed in the end wall 22 so as to face the obstacle 36. The downstream transducer is still installed in the same manner as that described with reference to FIG. 7.

It should be observed that by placing the downstream transducer 54 above or below the obstacle 36, the oscillation of the jet of gas is disturbed less than when the transducer is placed in the central cavity of said obstacle, thereby improving the quality of the ultrasound signal modulated by the oscillations of said jet of gas.

It would also be possible to tilt the upstream transducer 52 towards the bottom wall 30 of the fluidic oscillator.

Figure 9:
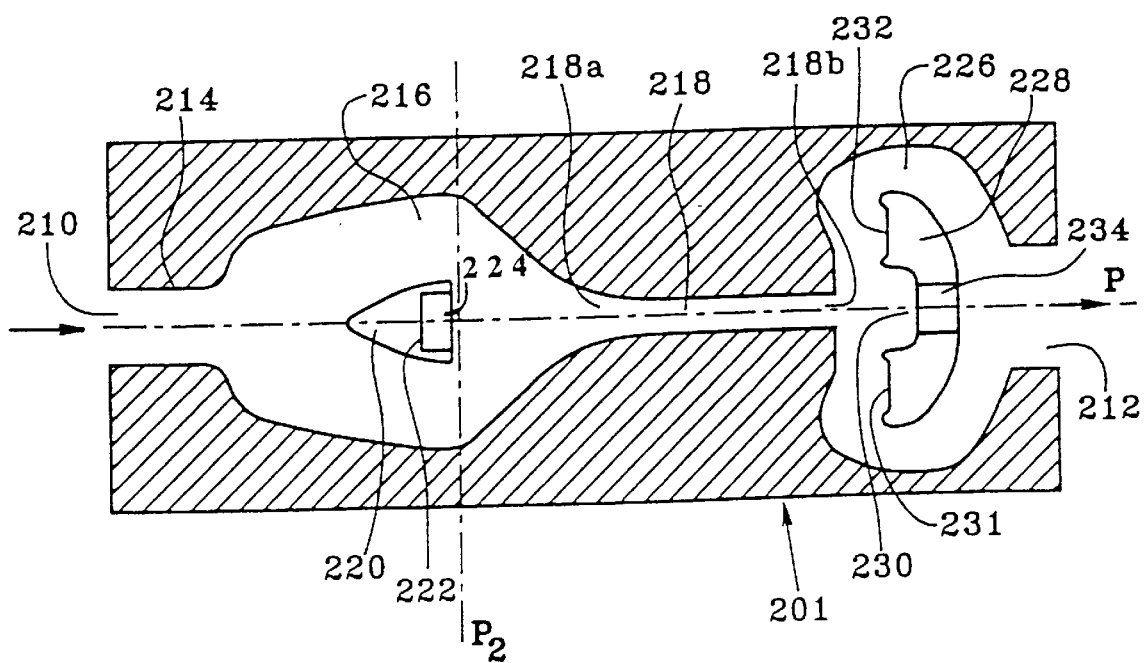
FIG. 9 is a diagrammatic view on the plane P1 of FIG. 1 through a second embodiment of a fluidic oscillator of the invention.

A second embodiment of the invention is shown in part in FIG. 9, and references to the various elements of this figure are preceded by the digit 2. The fluidic oscillator 201 is said to be "in line" since it has a gas feed 210 and a gas outlet 212 which are both in alignment in the longitudinal plane of symmetry P, unlike the embodiment shown in FIGS. 1 to 7 where the movement of the flow of gas is round a loop. The gas feed is connected to a passage 214 which has its downstream end opening out into a first chamber 216 that is in alignment with said passage on the plane P. The first chamber is of a shape that flares in a downstream direction until it comes level with a transverse plane P2 that is perpendicular to the plane P, after which it tapers so as to communicate with an upstream end 218a of a main channel 218 having the same characteristics as the main channel 26 shown in FIGS. 1 to 7. The first chamber also includes a streamlined element 220 situated substantially in the middle thereof and in alignment on the plane P. This element has a recess 222 that faces downstream and that receives an "upstream" ultrasound transducer 224, thereby protecting it from the flow. The streamlined element 220 may also serve to calm the gas flow.

The main channel 218 is aligned on the longitudinal plane of symmetry P and opens out into a second chamber 26 constituting an oscillation chamber having the same characteristics as the chamber 32 described above with reference to FIGS. 1 to 8. This oscillation chamber includes an obstacle 228 identical to the obstacle 36 shown in FIGS. 1 to 8. The obstacle 228 has a central cavity 230 situated facing the downstream open end 218b of the main channel 218 and it also has two secondary cavities 231 and 232 located on either side of said central cavity 230. A second ultrasound transducer 234 is received in the central cavity 230 so that the two ultrasound transducers are substantially in alignment on the longitudinal plane of symmetry P.

There follows a description with reference to FIGS. 10 to 16 of the method of measuring a volume-related quantity of a gas such as the volume of gas that flows through the fluidic oscillator as described above with reference to FIGS. 1 to 3.

By way of example, the range of gas flow rates to be measured extends from 5 l/h to 6000 l/h (a domestic gas meter).

An electronics unit 60 is shown diagrammatically in FIG. 10 and it serves firstly to feed the various functional blocks described below with electricity and secondly to control the method of measuring gas volume. The electronics unit 60 comprises a microcontroller 62 connected to an electricity power supply 64, e.g. a battery, and to a crystal clock 66 whose frequency is 10 MHz, for example, and which is also powered from the power supply 64. The microcontroller 62 is also connected to an emission block 68 and to a reception block 70, each of which is powered by the power supply. Each of these blocks comprises, for example, an operational amplifier and a converter, specifically a digital-to-analog converter for the emission block 68 and an analog-to-digital converter for the reception block 70. The electronics unit 60 also includes a switching circuit 72 that is powered by the power supply 64 and that is connected firstly to the emission and reception blocks 68 and 70, and secondly to the two ultrasound transducers 52 and 54.

When the oscillations of the jet of gas in the oscillation chamber 32 are too weak for it to be possible to detect the frequency thereof, i.e. when the flow rate of the gas is below a transition value which is equal to 100 l/h, for example, then the ultrasound transducers 52 and 54 are used to measure the flow rate and thus the volume of the gas in the following manner (low flow rate conditions):

the upstream transducer 52 emits an ultrasound signal towards the downstream transducer 54;

the downstream transducer 54 receives said ultrasound signal whose speed of propagation c is modified by the speed of the flow of gas vg (c+vg);

a first value is determined for a magnitude that is characteristic of the propagation speed of the received ultrasound signal, e.g. its propagation time;

the emitter and receiver functions of the ultrasound transducers 52 and 54 are interchanged;

the downstream transducer 54 now emits an ultrasound signal towards the upstream transducer 52;

the upstream transducer 52 receives this ultrasound signal that propagates at a speed (c−vg);

a second value is determined for the propagation time of the ultrasound signal; and a measurement of the gas flow rate is deduced therefrom which, by integration, serves to provide a measurement of the total volume of gas that has passed through the fluidic oscillator.

Figure 10:
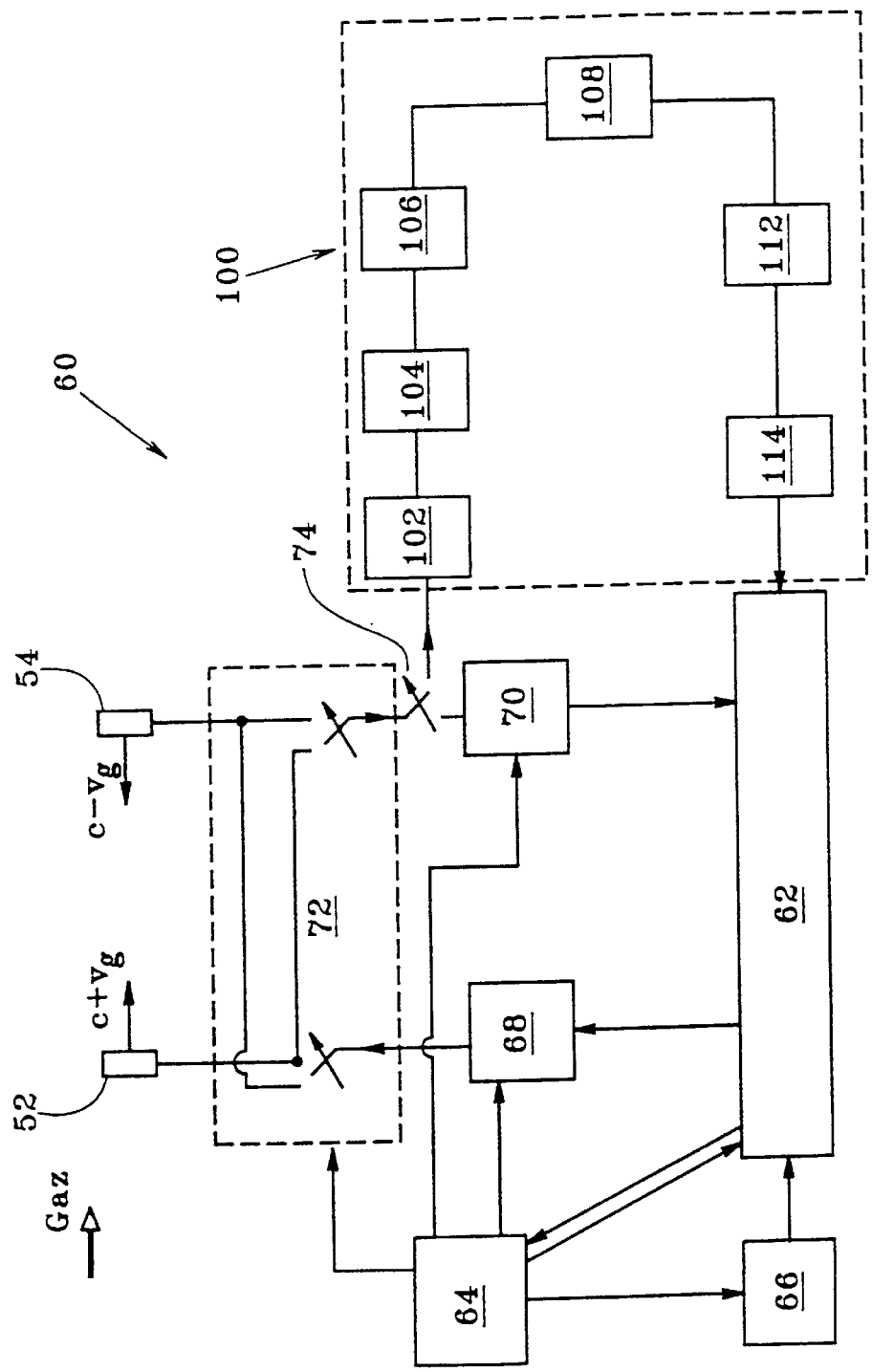
FIG. 10 is a block diagram showing a portion of the electronic circuit used for measuring the volume of gas flowing through the fluidic oscillator.

With reference to FIG. 10, a measurement is triggered as follows: the sequencer (not shown) of the microcontroller activates the emission block 68 to send an electrical signal to the upstream transducer 52, and also activates the power supply 64 to set the switching circuit 72 so that the emission block 68 is connected to the upstream transducer 52 and so that the reception block 70 is connected to the downstream transducer 54. The electrical signal excites the upstream transducer 52 which emits an ultrasound signal into the gas in the flow direction of the gas at a specific instant which is determined by the clock 66. The signal travels through the gas at speed c while the gas itself travels at a speed vg. After a time lapse t1 measured by the clock 66, the downstream transducer 54 receives the ultrasound signal which appears to have been propagating at the speed c+vg.

To measure the propagation time t1 of the ultrasound signal, reference may be made to the method described in European patent application No. 0 426 309. That method consists successively: in generating and transmitting an ultrasound signal made up of a plurality of cycles or pulses, including a phase change within the signal; in receiving the ultrasound signal; and in detecting the phase change within the received signal, such that the instant that corresponds to said phase change enables the propagation time t1 to be determined. Everything required for implementing that method of measuring propagation time is described in European patent application No. 0 426 309, and is therefore not described again herein.

Thereafter, the sequencer of the microcontroller 62 causes the switching circuit 72 to swap connections so that the emission block 68 is now connected to the downstream transducer 54 while the reception block 70 is connected to the upstream transducer 52. A second ultrasound signal is emitted in like manner by the downstream transducer 54 towards the upstream transducer 52 so a to travel in the opposite direction to the gas flow direction, and the clock 66 determines the time t2 required for said ultrasound signal to propagate, in the manner described above and in European patent application No. 0 426 309.

Given that the propagation times t1 and t2 can be expressed by the following relationships:

$$t1 = L/(c-vg)$$

$$t2 = L/(c+vg)$$

the arithmetic and logic unit (not shown) of the microcontroller 62 calculates the velocity of the gas vg by applying the following relationship:

$$vg = \frac{L}{2}\left[\frac{1}{t2} - \frac{1}{t1}\right]$$

from which a gas flow rate measurement Qm is deduced where:

$$Qm = S\frac{L}{2}\left[\frac{1}{t2} - \frac{1}{t1}\right]$$

S being the internal section of the channel 26.

The microcontroller 62 compares each measured flow rate value with the predetermined transition flow rate value as stored in its memory in order to determine whether the next measurement of flow rate should be performed using the above method or by detecting the frequency of oscillation of the jet of gas in the oscillation chamber 32 of the fluidic oscillation (high flow rate conditions). If the measured flow rate value is below the transition flow rate, then the flow rate of the gas is measured again after a predetermined time interval using the above method.

It should be observed that the fluidic oscillator of the present invention, referred to as a "combination" fluidic oscillator, makes it possible to use propagation time measurements on an ultrasound signal in the flow of gas at flow rate values that are small enough to avoid introducing errors into the flow rate measurements due to instabilities in the flow of gas, which instabilities are generated by the transition from laminar flow to turbulent flow. The low flow rate measurements thus have the advantage of being accurate and repeatable. In addition, given that this technique is used to cover a relatively narrow range of flow rates, it is possible to make do with narrow band ultrasound transducers that typically have a resonance frequency of 40 kHz, rather than using transducers that are more sophisticated, more expensive, and that are resonant at 100 kHz.

If the measured flow rate has a value that is greater than the transition flow rate value, then the oscillations of the jet of gas are strong enough for the frequency thereof to be detected (high flow rate conditions). Under such circumstances, the sequencer of the microcontroller 62 controls the switching circuit 72 so that the emission block 68 is connected to the downstream transducer 54 and the reception block 70 is connected to the upstream transducer 52. The sequencer also causes a switch 74 to operate so that the signal coming from the upstream transducer 52 is now treated by the electronics unit 100 that can be seen on the right of FIG. 10. This unit is described below in greater detail with reference to FIG. 11.

Under high flow rate conditions, the microcontroller 62 causes the emission block 68 to generate a permanent electrical signal for exciting the downstream ultrasound transducer 54, e.g. a squarewave signal, at a frequency fu so that the downstream transducer continuously emits an ultrasound signal of frequency fu towards the upstream transducer 54 in a direction that is inclined at about 1.5° to the longitudinal plane of symmetry P. The ultrasound signal received by the upstream transducer is a signal of frequency fu modulated by the frequencies f and 2f that are characteristic of the oscillation phenomenon of the jet of gas. By way of example, the frequency fu may be equal to 40 kHz and the amplitude of the electrical excitation signal may be 20 mV.

The Applicant has been able to observe that by emitting the ultrasound signal against the flow of gas, it is possible to reduce considerably the influence of the hydrodynamic pressure of the jet, thereby reducing the energy of the signal that is received in respect of the frequency 2f. By way of example, a difference of 10 dB has been observed on the amplitude of the signal received at the frequency 2f, and that suffices to make it possible to distinguish the frequency f from the frequency 2f in the modulated signal while using electronic equipment that is simple, cheap, and consumes little energy. The Applicant has also observed that by emitting the ultrasound signal against the flow of gas, the modulated ultrasound signal presents periodicity in time, thereby facilitating detection of the frequency f.

Thus, when the upstream transducer 52 receives an ultrasound signal modulated by the oscillations of the jet of gas, this signal is initially amplified by a low noise analog amplifier 102. The analog amplifier 102 is a non-inverting amplifier designed for coupling to the electronic circuit that performs measurements under low flow rate conditions, and it is constituted by an operational amplifier $A_1$ whose non-inverting input is connected firstly to the modulated signal as received by the upstream transducer 52 and secondly to ground via a resistor $R_1$. The inverting input of this operational amplifier $A_1$ is connected firstly to ground via a resistor $R_2$ and secondly to the output $B_0$ of the amplifier via another resistor $R_3$. The modulated and amplified ultrasound signal then has the appearance shown in FIG. 12.

Figure 11:
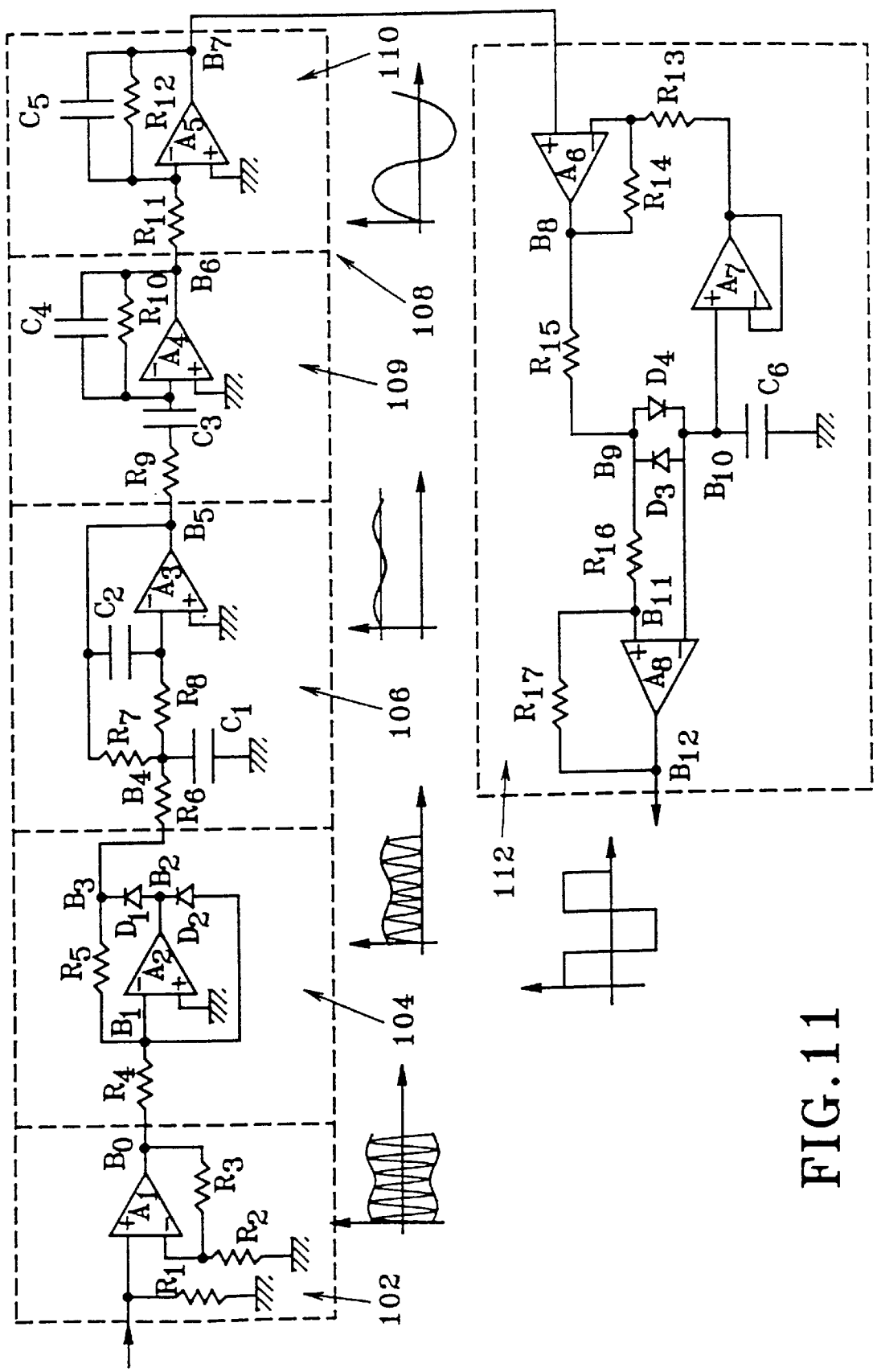
FIG. 11 is a detailed view on a larger scale of the electronics block 100 in FIG. 10.
Figure 12:
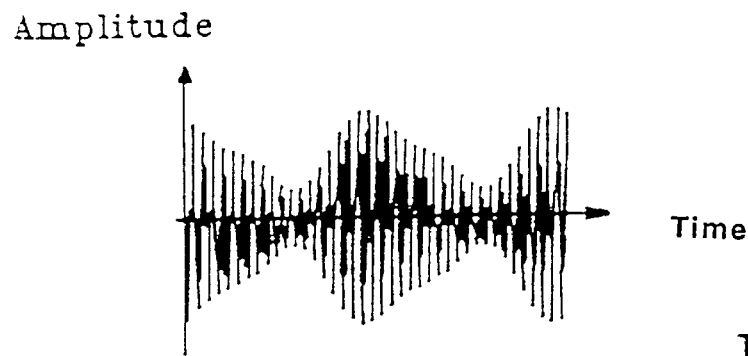
FIG. 12 shows the modulated ultrasound signal as amplified by amplifier 102 in FIG. 11.
Figure 13:
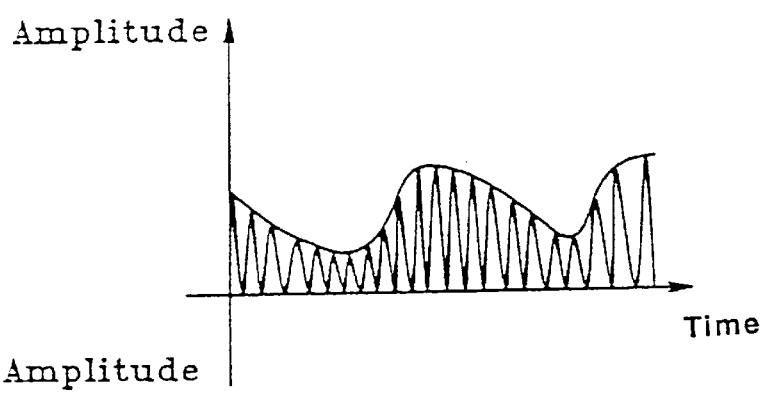
FIG. 13 shows the ultrasound signal of FIG. 12 after it has been rectified by circuit 104 in FIG. 11.
Figure 14:
FIG. 14 shows the ultrasound signal of FIG. 13 after it has been filtered by electronics block 106 of FIG. 11.

A conventional halfwave rectifier circuit 104 is shown in FIG. 11 and comprises a resistor $R_4$ connected between the output $B_0$ of the amplifier $A_1$ and the inverting input $B_1$ of an operational amplifier $A_2$ whose non-inverting input is connected to ground. The inverting input of the amplifier $A_2$ is connected to the output $B_2$ of said amplifier via two parallel-connected branches: a first branch is constituted by a resistor $R_5$ in series with a diode $D_1$ that is reverse-connected; and a second branch which is constituted by a diode $D_2$. In conventional manner, when the difference $V_{B1}-V_{B2}$ is greater than the threshold voltage of the diode $D_1$, then it conducts giving $V_{B3}=(R_5/R_4)V_{B2}$. Conversely, when the value $V_{B1}-V_{B2}$ drops below the threshold voltage of the diode $D_1$, then the diode $D_2$ becomes conductive and $V_{B3}=0$, the rectified signal having the appearance given in FIG. 13.

In order to retain only the oscillation frequency f of the jet of gas, the rectified signal is then filtered by electronics block 106 which acts as a (second order) lowpass filter. As shown in FIG. 11, the block 106 has two resistors $R_6$ and $R_8$, and a capacitor $C_1$ forming a T-filter which is subjected to negative feedback by a resistor $R_7$ and a capacitor $C_2$ together with an operational amplifier $A_3$ whose non-inverting input is connected to ground. The filtered signal obtained at $B_5$ has the appearance shown in FIG. 14.

This signal is then injected into an amplification electronics block 108 that comprises two stages: a first stage 109 that acts as a bandpass amplifier having a gain of 50, for example, and having a cutoff frequency lying in the range 0.5 Hz to 50 Hz; and a second stage 110 that acts as a lowpass amplifier having a gain equal to 5, for example, and a cutoff frequency equal to 50 Hz.

The first stage comprises a resistor $R_9$ and a capacitor $C_3$ connected in series between the output $B_5$ of block 106 and the inverting input of an operational amplifier $A_4$. The non-inverting input of the amplifier $A_4$ is connected to ground, and its inverting input is connected to its outputs $B_6$ via a capacitor $C_6$ and a resistor $R_{10}$ connected in parallel.

The second stage 110, downstream from $B_6$, comprises a resistor $R_{11}$ connected to the inverting input of an operational amplifier $A_5$, which input is also connected to the output $B_7$ of the amplifier via a resistor $R_{12}$ and a capacitor $C_5$ connected in parallel. The non-inverting input of the amplifier $A_5$ is connected to ground.

Figure 15:
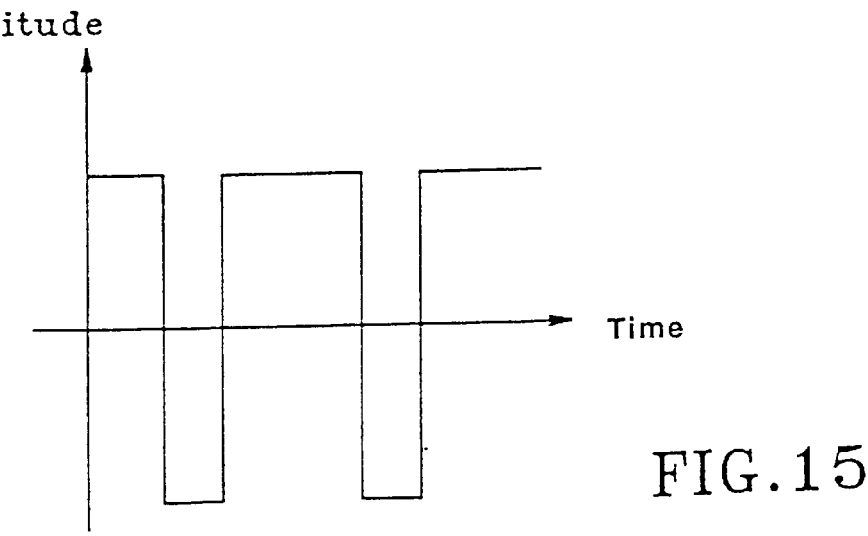
FIG. 15 shows the ultrasound signal of FIG. 14 after passing through electronic amplification block 108 and through electronic peak detection block 112.

The electronics block 108 serves to shift the signal from the filter 106 so as to place it on either side of zero, and to amplify said signal. The signal as amplified in this way that appeared at $B_7$ is injected into the following block 112 which transforms it into a pulse signal as shown in FIG. 15.

The electronics block 112 comprises an operational amplifier $A_6$ whose non-inverting input is connected to the output $B_7$, and whose inverting input is connected firstly to the output $B_8$ of the amplifier $A_6$ via a resistor $R_{14}$, and secondly to the output of a conventional follower circuit that comprises an operational amplifier $A_7$. Because of the negative feedback from the follower circuit, the amplifier $A_6$ makes it possible to amplify small amplitude signals more than large amplitude signals.

This block also includes a resistor $R_{15}$ connected to the output $B_8$ of the amplifier $A_6$ and to a point $B_9$, and it also includes two diodes $D_3$ and $D_4$ mounted head to tail between the point $B_9$ and a point $B_{10}$. The point $B_{10}$ to connected firstly to ground via a capacitor $C_6$ and secondly to the non-inverting input of the follower circuit $A_7$ and to the inverting input of a further operational amplifier $A_8$. The output of operational amplifier $A_8$ (point $B_{12}$) is looped back to its non-inverting input via a resistor $R_{17}$. The non-inverting input of this amplifier is also connected to the diodes $D_3$ and $D_4$ via a resistor $R_{16}$. When the amplitude of the voltage $V_{B9}-V_{B10}$ increases to exceed the threshold of diode $D_4$, then the diode conducts and the value of the voltage signal at point $B_9$ minus the voltage drop across diode $D_4$ is stored in capacitor $C_6$. The differential amplifier $A_8$ then compares the value of the voltage at point $B_{11}$ as given by:

$$V_{B11} = \frac{V_{B9}R_{17} + V_{B12}R_{16}}{R_{17} + R_{16}}$$

with the value of the voltage on capacitor $C_6$, and it produces a high value signal when the voltage at point $B_9$ is greater than the voltage on the capacitor $C_6$.

Once a peak has been reached and the amplitude of the signal deceases, the difference between the value of the signal at point $B_9$ and the value of the signal stored by the capacitor $C_6$ drops below the threshold of the diode $D_4$ so the diode $D_4$ becomes non-conducting. The value of the signal stored on capacitor $C_6$ then remains unchanged. When the amplitude of the signal at point $B_9$ drops below the value of the signal stored on the capacitor $C_6$, then the amplifier $A_8$ provides a low level signal showing that a peak has occurred. When the amplitude of the signal drops below the value of the signal stored on the capacitor $C_6$ by an amount that corresponds to the threshold of the diode $D_3$ plus the voltage at $B_{10}$, then the diode $D_3$ starts to conduct and the value of the signal as stored on the capacitor $C_6$ drops to the value of the signal at point $B_9$ minus the voltage drop across the diode $D_3$. When a negative peak is reached and passed, the diode $D_3$ will again become non-conducting, and the amplifier $A_8$ will indicate a change in state once the signal at point $B_{11}$ has increased to above the value of the signal stored on the capacitor $C_6$.

Figure 16:
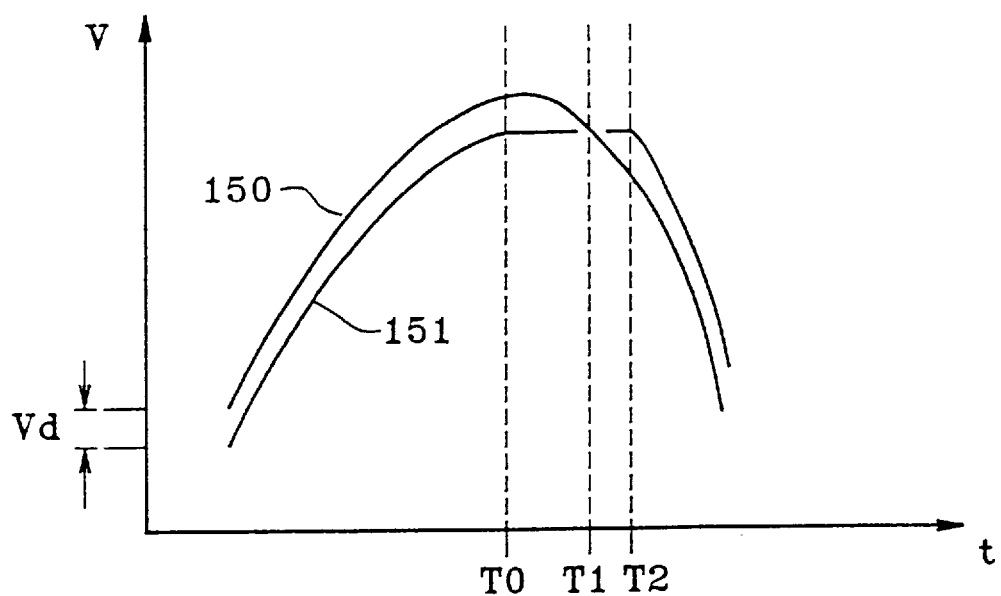
FIG. 16 shows the operation performed on a peak by the peak detection electronics block 112.

In FIG. 16, curve 150 shows how the voltage of the first signal at point $B_9$ varies, and curve 151 shows how the voltage across capacitor $C_6$ varies. Initially, the capacitor voltage 151 is equal to the signal 150 minus the value Vd that corresponds to the voltage drop across the diode $D_4$, so the amplifier $A_8$ provides a high level signal. When a peak is reached at time T0, and while the voltage of the signal 150 has dropped under the threshold of the diode $D_4$, the voltage on the capacitor 151 remains unchanging. At time T1 the voltage of the signal 150 drops below the voltage stored on the capacitor 150 so the output of the amplifier $A_8$ provides a low level signal. At time T2, the difference between the voltage of the first signal 150 and the voltage stored on the capacitor 151 becomes greater than the threshold voltage for the diode $D_4$ so the capacitor voltage again tracks the voltage of the first signal. The electronic circuit corresponding to block 112 is thus a peak detector. The amplifier $A_8$ of FIG. 11 is a comparator with hysteresis that compares the values of the two voltages 150 and 151 shown in FIG. 16. Thus, when the value of the voltage at point $B_{11}$, i.e. $V_{B11}$, the voltage on the non-inverting input of the amplifier $A_8$, is greater than the value of the voltage at point $B_{10}$, i.e. $V_{B10}$, the voltage on the inverting input of the amplifier $A_8$, then the amplifier provides a constant output voltage equal to +Vcc where Vcc is the power supply voltage of said amplifier, and the voltage at $B_{11}$ becomes:

$$V_{B11} = \frac{VccR_{16} + V_{B9}R_{17}}{R_{16} + R_{17}}$$

Conversely, and as shown at instant T1 in FIG. 16, when $V_{B11}$ is less than $V_{B10}$, then the output voltage of the amplifier $A_8$ is equal to –Vcc so the voltage at $B_{11}$ becomes:

$$V_{B11} = \frac{-VccR_{16} + V_{B9}R_{17}}{R_{16} + R_{17}}$$

As a result the output from the block 112 is in the form of a pulse signal in which each pulse represents a unit volume of gas being swept by the jet of gas during a single oscillation (FIG. 15).

An electronic counter (FIG. 10), e.g. a 16-bit counter, then serves to count the total number of pulses, thereby enabling the microcontroller to deliver the volume of gas that has flowed through the fluidic oscillator.

It should be observed that if the transducers 52 and 54 are accurately aligned on the longitudinal plane of symmetry P in order to enhance received signal energy at the frequency 2f, then the above-described electronic circuit 100 needs to be adapted specifically to detect that frequency.

When the oscillations of the jet of gas become too weak for the frequency thereof to be detectable, i.e. when the flow rate of the gas becomes less than the above-mentioned transition flow rate, provision is made to use the ultrasound transducers 52 and 54 to measure the propagation time of ultrasound signals in the flow of gas as described above (low flow rate conditions). In order to decide when to use low flow rate conditions or high flow rate conditions, it is possible, for example, to measure the time interval between two successive pulses and to compare the time interval measured in this way with a predetermined value that corresponds to the transition flow rate. If the measured time interval exceeds the predetermined value, then the ultrasound transducers are used alternately as emitter and receiver.

It is also possible to provide for an overlap range, e.g. extending from 100 l/h to 150 l/h, over which both operating conditions of the combination fluidic oscillator may be used. Thus, if the fluidic oscillator is operating under low flow rate conditions, it may continue to measure flow rate in that way until the high value of the overlap range is reached, at which point measurement switches over to high flow rate conditions. Similarly, when the fluidic oscillator is operating under high flow rate conditions, then it is necessary for the flow rate to drop below the lower value of the overlap range before the fluidic oscillator switches over to measuring under low flow rate conditions.

The advantage of having an overlap range is to make it unlikely that it will be necessary to switch measurement conditions back again to the preceding conditions immediately after a switchover has taken place.

Figure 17:
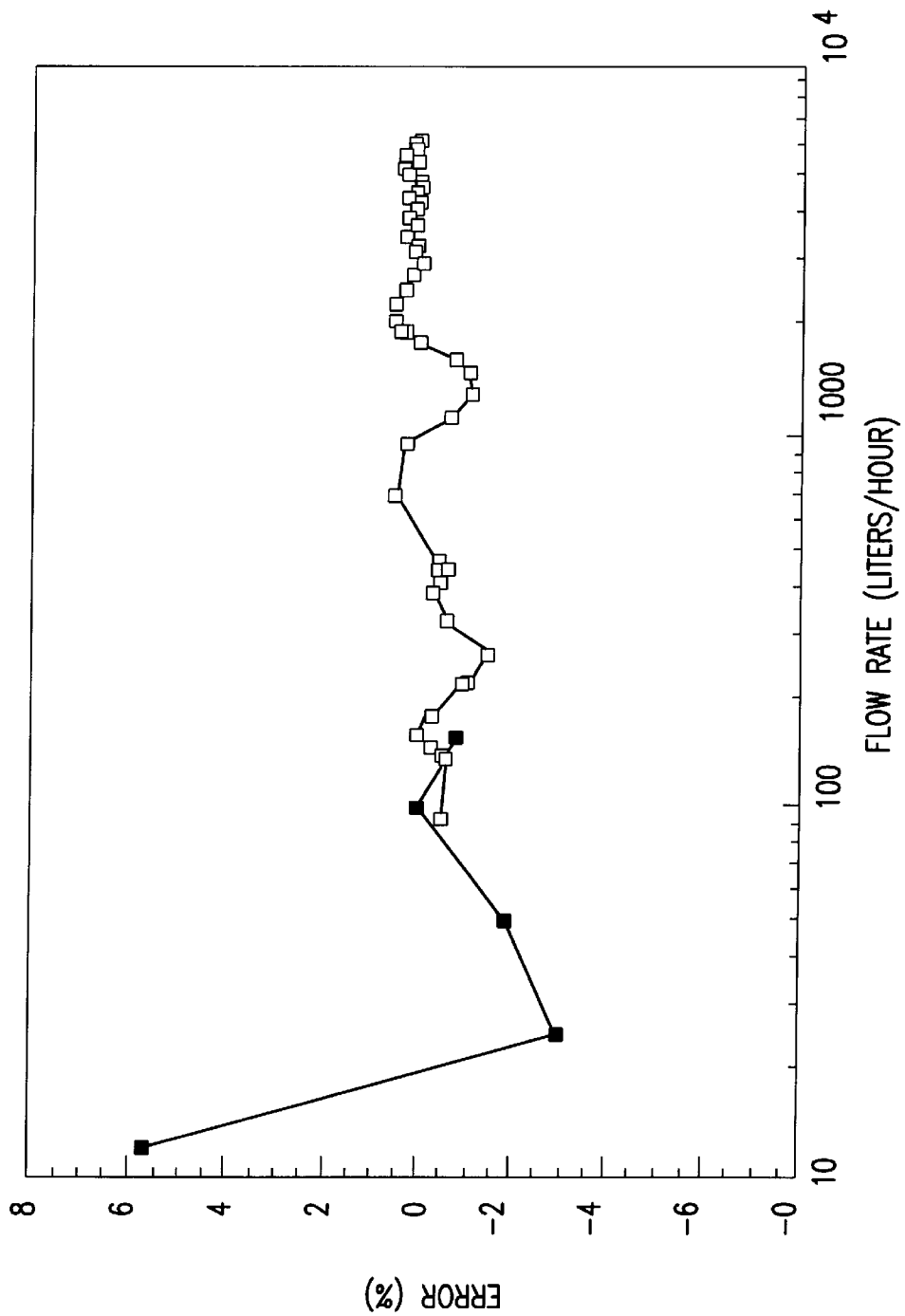
FIG. 17 is a calibration curve for the fluidic oscillator of the invention.

The combination fluidic oscillator of the present invention can be adapted to various flow rate ranges, and is capable, in particular, of covering flow rates at greater than 6000 l/h. FIG. 17 is a calibration curve for the combination fluidic oscillator operating over flow rates extending within a range of about 10 l/h to about 7000 l/h. The curve shows the relative error applicable to measurement throughout the above range. It can thus be seen that the combination fluidic oscillator is entirely suitable for measurement purposes throughout this large range of flow rates.

It will be observed that the invention has the advantage of also being applicable to other types of fluidic oscillators, e.g. that described in patent application GB-A-2 120 384, which is based on the Coanda effect. It is quite possible to envisage using the combination fluidic oscillator of the invention both to cover a range of fluid flow rates over which oscillations of the jet of fluid are strong enough for the frequency thereof to be detected, and also to use the low flow rate operating conditions as explained above solely for determining a leakage flow rate. For example, a fluidic oscillator of the invention could be used as a commercial gas meter (flow rate range 0.25 m³/h to 40 m³/h) or as an industrial gas meter (flow range 1 m³/h to 160 m³/h) that is capable of measuring a leakage rate.

It is also possible to increase meter sensitivity by positioning the ultrasound transducers accurately in the longitudinal plane of symmetry of the fluidic oscillator.

We claim:

1. A fluidic oscillator that is symmetrical about a longitudinal plane of symmetry in which a longitudinal fluid flow direction is contained, the oscillator comprising:

means for generating a two-dimensional jet of fluid that oscillates transversely relative to said longitudinal plane of symmetry;

two ultrasound transducers disposed in different transverse planes, an "upstream" one of said transducers being disposed upstream from the means for generating the two-dimensional jet of fluid, the other transducer being a "downstream" transducer;

and means firstly for generating an ultrasound signal in the fluid flow travelling from one of said transducers towards the other, and secondly for receiving said ultrasound signal as modulated by the oscillations of the jet of fluid; and means for processing the received signal so as to determine a volume-related quantity concerning the fluid that has flowed through said fluidic oscillator; characterized in that the ultrasound transducers are substantially in alignment with the longitudinal plane of symmetry.

2. A fluidic oscillator according to claim 1, characterized in that for small volume-related quantities of fluid flowing through said fluidic oscillator, the ultrasound transducers are suitable for measuring said small volume-related quantities of fluid.

3. A fluidic oscillator according to claim 2, characterized in that it includes:
means for emitting and receiving an ultrasound signal alternately from each of the ultrasound transducers; and
means responsive to each received ultrasound signal and to consecutive pairs of ultrasound signals to determine a value for a magnitude that is characteristic of the propagation speed of said ultrasound signal as modified by the fluid flow, and to deduce therefrom a volume-related quantity applicable to the fluid that has flowed through said fluidic oscillator.

4. A fluidic oscillator according to claim 3, characterized in that the magnitude characteristic of the propagation speed of the ultrasound signal is the propagation time of said signal.

5. A fluidic oscillator according to claim 3, characterized in that the magnitude characteristic of the propagation speed of the ultrasound signal is the phase of said signal.

6. A fluidic oscillator according to claim 1, characterized in that the means for generating an oscillating two-dimensional jet of fluid are formed by a fluid admission opening of transverse size or width d and of height h, and in that it comprises:
an oscillation chamber connected at one of its end to said fluid admission opening and at its opposite end to a fluid outlet opening, said openings being in alignment in said longitudinal plane of symmetry; and
at least one obstacle disposed in said oscillation chamber between the admission opening and the fluid outlet opening.

7. A fluidic oscillator according to claim 1, characterized in that the upstream transducer is disposed upstream from the fluid admission opening.

8. A fluidic oscillator according to claim 6, characterized in that the obstacle as a front portion in which a city is formed facing the fluid admission opening.

9. A fluidic oscillator according to claim 1, characterized in that the downstream transducer is secured to the obstacle.

10. A fluidic oscillator according to claim 8, characterized in that the downstream transducer is disposed in the cavity of the obstacle.

11. A fluidic oscillator according to 6, characterized in that it includes, upstream from the obstacle, a passage for the fluid that is defined by two walls that are perpendicular to the longitudinal plane of symmetry and that are spaced apart by a distance h.

12. A fluidic oscillator according to claim 11, characterized in that it includes, upstream from the fluid admission opening, a longitudinally-extending channel forming at least a portion of the passage for the fluid, said channel being of substantially constant width d that is perpendicular to the distance h.

13. A fluidic oscillator according to claim 12, characterized in that the channel possesses, at one of its ends, a "downstream" opening that corresponds to the fluid admission opening, and its opposite end, an "upstream" opening which, in a plane parallel to the flow direction of the fluid and perpendicular to the longitudinal plane of symmetry, is convergent in shape, its width tapering progressively down to the width d.

14. A fluidic oscillator according to claim 12 characterized in that upstream transducer is disposed upstream from the channel.

15. A fluidic oscillator according to claim 12, characterized in that it includes two fluid inlets disposed symmetrically about the longitudinal plane of symmetry and opening out into the passage, upstream from the channel.

16. A fluidic oscillator according to claim 15, characterized in that an empty space forming another portion of the passage for the fluid is provided upstream from the channel and in that the two fluid inlets open out into said empty space.

17. A fluidic oscillator according to claim 16, characterized in that the upstream transducer is disposed upstream from the empty space.

18. A fluidic oscillator according to claim 1, characterized in that the ultrasound transducers are situated on the same side in a direction perpendicular to the longitudinal direction of the fluid flow, and contained in the longitudinal plane of symmetry.

19. A fluidic oscillator according to claim 18, characterized in that both ultrasound transducers are secured to the same one of the walls defining the passage for the fluid.

20. A fluidic oscillator according to claim 17, characterized in that the ultrasound transducers are offset in a direction perpendicular to the longitudinal direction of fluid flow and contained in the longitudinal plane of symmetry.

21. A fluidic oscillator according to claim 20, characterized in that each ultrasound transducer is secured to a respective one of the walls defining the passage for the fluid.

22. A method of measuring a volume-related quantity of a fluid flowing through a fluidic oscillator in which a jet of fluid oscillates transversely about a longitudinal plane of symmetry, said method consisting successively in;
emitting an ultrasound signal into the fluid flow from an ultrasound transducer;
receiving said ultrasound signal as modulated by the oscillations of the jet of fluid by using another ultrasound transducer; and
processing the received signal so as to determine said volume-related quantity of the fluid that has flowed through the oscillator wherein both ultrasound transducers are disposed in different transverse planes, an "upstream" one of said transducers being disposed upstream from a means for generating the jet of fluid, the other transducer being a "downstream" transducer;
the method being characterized in that it consists in emitting an ultrasound signal in a direction that is substantially contained in the longitudinal plane of symmetry.

23. A method according to claim 22, characterized in that said method consists in emitting the ultrasound signal in the flow direction of the fluid flowing through the fluidic oscillator.

24. A method according to claim 23, characterized in that after receiving the ultrasound signal and on the basis of said ultrasound signal, the method consists in detecting a frequency of oscillation that is equal to twice the frequency of oscillation of the jet of fluid, thereby making it possible to improve measurement sensitivity.

25. A method according to claim 22, characterized in that said method consists in emitting an ultrasound signal in the opposite direction to the flow direction of the fluid through the fluidic oscillator.

26. A method according to claim 22, characterized in that for small volume-related quantities of fluid flowing through the fluidic oscillator, said method consists successively in:
emitting an ultrasound signal from one of the transducers towards the other in a direction that is substantially contained in the longitudinal plane of symmetry;
receiving said ultrasound signal whose speed of propagation has been modified by the flow of the fluid;

determining a first value of a magnitude characteristic of said speed of propagation of the received ultrasound signal;

repeating the above steps after interchanging the emitter and receiver functions of the ultrasound transducers and determining a second value for said magnitude characteristic of the speed of propagation for another ultrasound signal; and deducing therefrom the measurement of a small volume-related quantity of the fluid.

27. A method according to claim 26, characterized in that the magnitude characteristic of the propagation speed of the ultrasound signal is the propagation time of said signal.

28. A method according to claim 26, characterized in that the magnitude characteristic of the propagation speed of the ultrasound signal is the phase of said signal.

29. The use of a fluidic oscillator according to claim 1 for measuring a volume-related quantity of a gas.

* * * * *